(12) United States Patent
Paglia et al.

(10) Patent No.: US 11,870,827 B2
(45) Date of Patent: *Jan. 9, 2024

(54) METHODS, SYSTEMS, AND MEDIA FOR NAVIGATING THROUGH A STREAM OF CONTENT ITEMS

(71) Applicant: Google LLC, Mountain View, CA (US)

(72) Inventors: Marco Paglia, San Francisco, CA (US); William Frederick Kiefer, Seattle, WA (US); Jokubas Zukerman, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,183

(22) Filed: Jan. 27, 2023

(65) Prior Publication Data

US 2023/0171296 A1  Jun. 1, 2023

Related U.S. Application Data

(63) Continuation of application No. 17/007,109, filed on Aug. 31, 2020, now Pat. No. 11,570,224, which is a
(Continued)

(51) Int. Cl.
*G06F 3/0482* (2013.01)
*H04L 65/60* (2022.01)
(Continued)

(52) U.S. Cl.
CPC ............ *H04L 65/60* (2013.01); *G06F 3/0482* (2013.01); *H04L 51/04* (2013.01); *H04L 51/046* (2013.01); *H04L 51/10* (2013.01)

(58) Field of Classification Search
CPC ..... G06F 3/0482; H04L 51/04; H04L 51/046; H04L 51/10; H04L 65/60
See application file for complete search history.

(56) References Cited

U.S. PATENT DOCUMENTS 7,466,977 B2   12/2008  Levien et al.
10,225,700 B2 *  3/2019  Cheung ................. G06F 3/0482
(Continued)

OTHER PUBLICATIONS

Notice of Allowance dated Apr. 22, 2020 in U.S. Appl. No. 14/980,223.
(Continued)

*Primary Examiner* — Dino Kujundzic
(74) *Attorney, Agent, or Firm* — Shumaker & Sieffert, P.A.

(57) ABSTRACT

Methods, systems, and media for navigating through content are provided. In some embodiments, the method comprises: receiving a first plurality of interactive stream items; causing the first plurality of interactive stream items to be presented in a first presentation mode; receiving a first user selection of an interactive stream item from at least a portion of the first plurality of interactive stream items; continuing to receive the stream of content including a second plurality of interactive stream items; determining a second presentation mode based at least in part on a content type associated with the second plurality of interactive stream items; causing the second plurality of interactive stream items to be presented in a second presentation mode; receiving a second user selection indicating that the interactive stream item is no longer selected; and causing the second plurality of interactive stream items to be presented in the first presentation mode.

21 Claims, 13 Drawing Sheets

Related U.S. Application Data continuation of application No. 14/980,223, filed on Dec. 28, 2015, now Pat. No. 10,764,343.

(51) Int. Cl.
*H04L 51/046* (2022.01)
*H04L 51/04* (2022.01)
*H04L 51/10* (2022.01)

(56) References Cited

U.S. PATENT DOCUMENTS

| | | | |
|---|---|---|---|
| 10,547,569 B1* | 1/2020 | Lewis | G06Q 50/01 |
| 2001/0051998 A1 | 12/2001 | Henderson | |
| 2003/0134678 A1* | 7/2003 | Tanaka | A63F 13/35 463/42 |
| 2004/0019489 A1 | 1/2004 | Funk et al. | |
| 2007/0204302 A1 | 8/2007 | Calzone | |
| 2009/0094343 A1* | 4/2009 | Mehrotra | G06F 15/16 709/207 |
| 2009/0119370 A1 | 5/2009 | Stern et al. | |
| 2009/0310933 A1 | 12/2009 | Lee | |
| 2010/0333143 A1 | 12/2010 | Civanlar et al. | |
| 2011/0113363 A1 | 5/2011 | Hunt et al. | |
| 2012/0057075 A1 | 3/2012 | Kabuto et al. | |
| 2012/0060103 A1* | 3/2012 | Arasaki | G06F 9/542 715/752 |
| 2013/0117376 A1 | 5/2013 | Filman et al. | |
| 2013/0159878 A1* | 6/2013 | Kim | G06F 3/0482 715/752 |
| 2013/0339855 A1 | 12/2013 | Shivadas et al. | |
| 2014/0013200 A1* | 1/2014 | White | G06F 16/78 715/230 |
| 2014/0067828 A1 | 3/2014 | Archibong et al. | |
| 2014/0118474 A1* | 5/2014 | Fluhr | H04L 12/1822 348/14.09 |
| 2014/0133836 A1 | 5/2014 | Burns | |
| 2014/0215352 A1* | 7/2014 | Blecon | H04L 12/1827 715/752 |
| 2015/0040033 A1 | 2/2015 | Kurtz et al. | |
| 2015/0106863 A1 | 4/2015 | Zhou et al. | |
| 2015/0128179 A1 | 5/2015 | Cormican et al. | |
| 2015/0135234 A1 | 5/2015 | Hall | |
| 2015/0169208 A1* | 6/2015 | Cho | H04L 12/1827 715/752 |
| 2015/0189234 A1 | 7/2015 | Shapiro | |
| 2015/0256796 A1 | 9/2015 | Ma | |
| 2020/0044996 A1* | 2/2020 | Johnson | H04L 51/046 |

OTHER PUBLICATIONS

Notice of Allowance dated Oct. 3, 2022 in U.S. Appl. No. 17/007,109.
Office Action dated Jan. 3, 2020 in U.S. Appl. No. 14/980,223.
Office Action dated Apr. 17, 2018 in U.S. Appl. No. 14/980,223.
Office Action dated May 2, 2019 in U.S. Appl. No. 14/980,223.
Office Action dated Jun. 15, 2022 in U.S. Appl. No. 17/007,109.
Office Action dated Oct. 30, 2018 in U.S. Appl. No. 14/980,223.

* cited by examiner

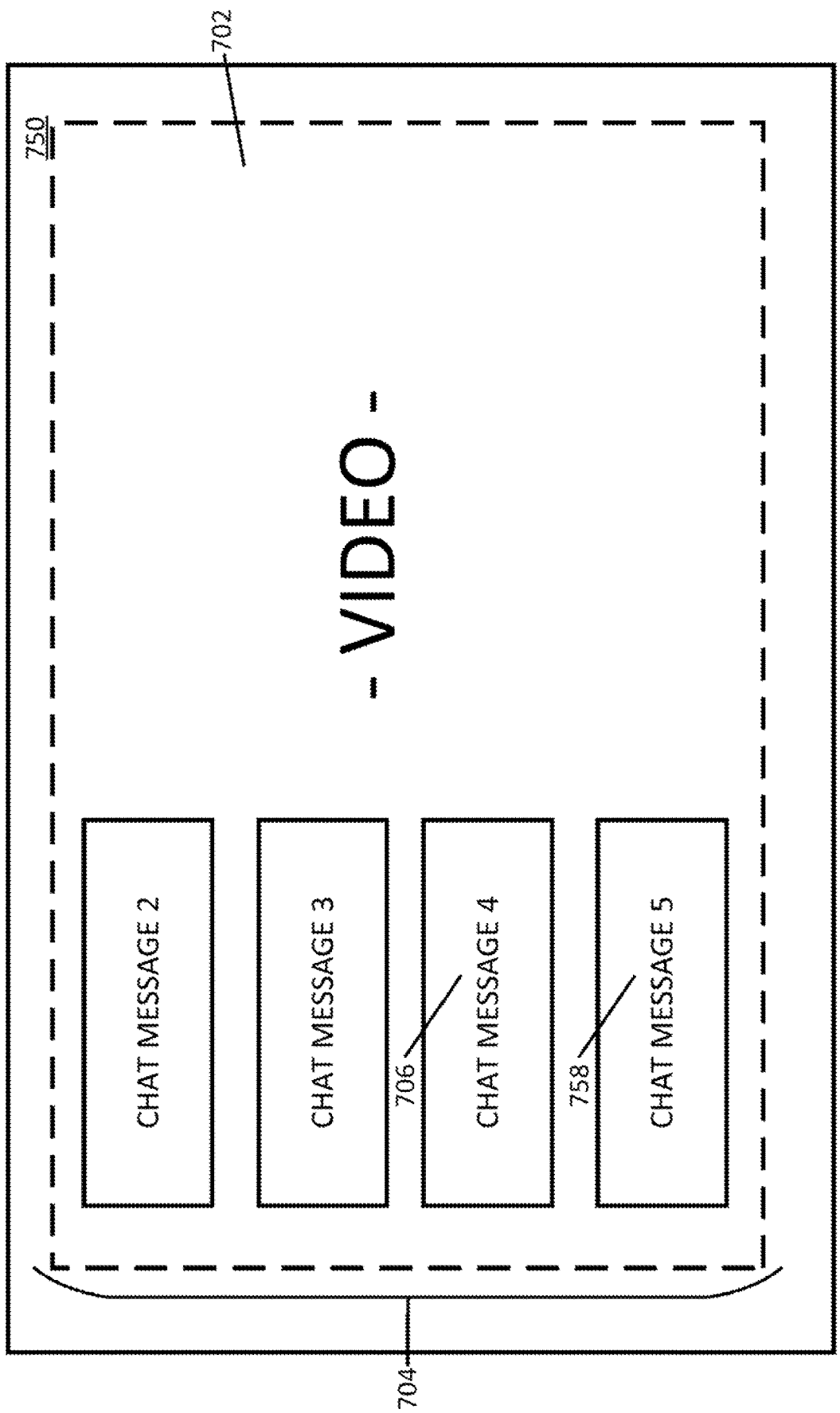

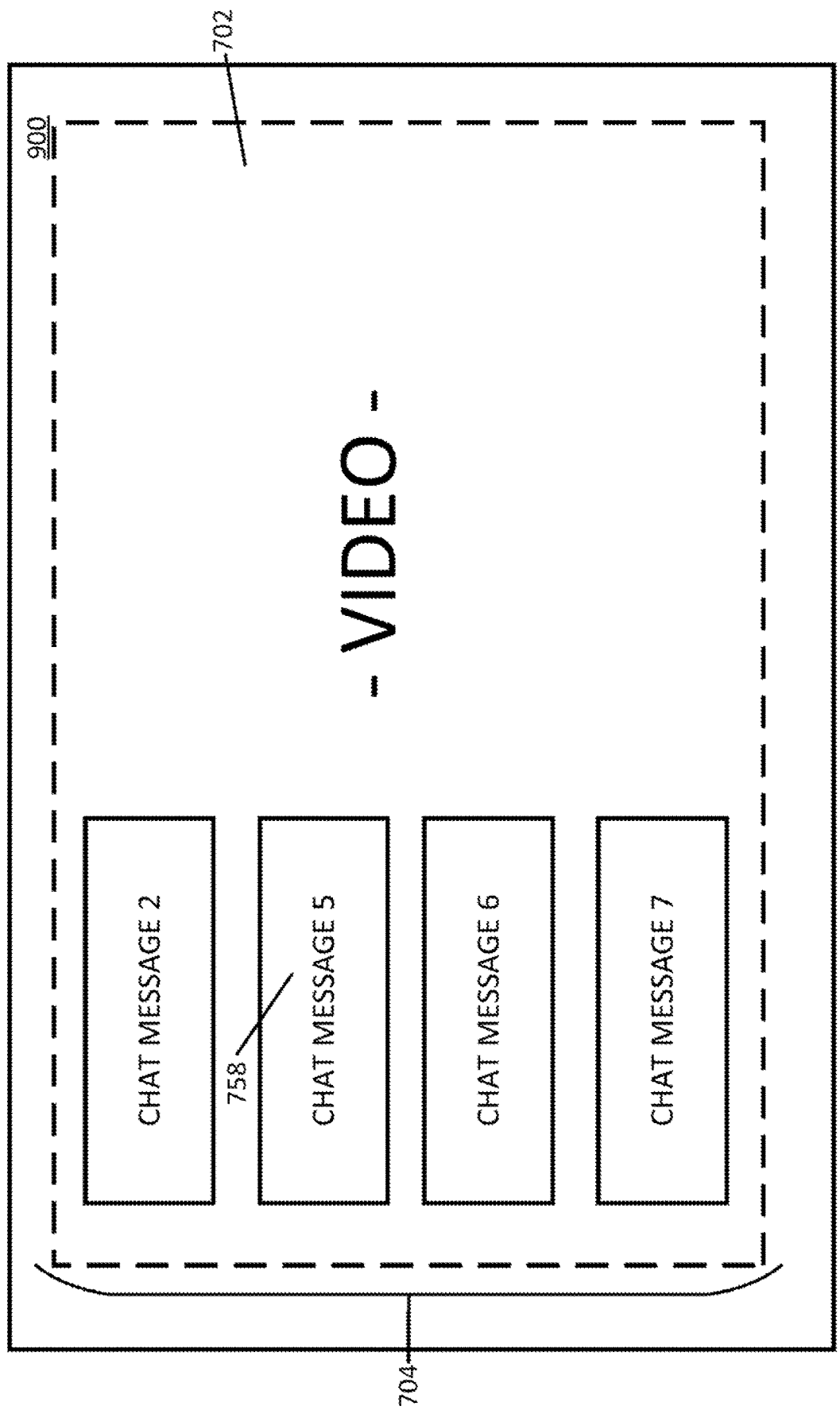

METHODS, SYSTEMS, AND MEDIA FOR NAVIGATING THROUGH A STREAM OF CONTENT ITEMS

CROSS-REFERENCE TO RELATED APPLICATIONS

This application is a continuation of U.S. patent application Ser. No. 17/007,109, filed Aug. 31, 2020, which is a continuation of U.S. patent application Ser. No. 14/980,223, filed Dec. 28, 2015, each of which is incorporated by reference herein in its entirety.

TECHNICAL FIELD

The disclosed subject matter relates to methods, systems, and media for navigating through a stream of content items.

BACKGROUND

People often participate in online chats with others. For example, people might want to participate in a chat while watching a video. In some cases, screens that present the chat messages or media content might include interactive content, such as interfaces to initiate a video call with another user, share a video, post a comment on a page, etc. However, it can be difficult to present received messages in the chat while a user is simultaneously viewing media content on the screen.

Accordingly, it is desirable to provide methods, systems, and media for navigating through a stream of content items.

SUMMARY

Methods, systems, and media for navigating through a stream of content items are provided. In accordance with some embodiments of the disclosed subject matter, methods for navigating through a stream of content items are provided, the methods comprising: causing a media content item to be presented in a user interface; receiving a stream of content including a first plurality of interactive stream items; causing the first plurality of interactive stream items to be presented in a first presentation mode, wherein the first presentation mode presents each of the first plurality of interactive stream items in a region of the user interface as each of the first plurality of interactive stream items is received and as the media content item is being presented; receiving a first user selection of an interactive stream item from at least a portion of the first plurality of interactive stream items that is currently being presented in the region of the user interface; continuing to receive the stream of content including a second plurality of interactive stream items; in response to receiving the first user selection and the second plurality of interactive stream items, determining a second presentation mode based at least in part on a content type associated with the second plurality of interactive stream items; causing the second plurality of interactive stream items to be presented in a second presentation mode, wherein the second presentation mode presents each of the second plurality of interactive stream items adjacent to the selected interactive stream item; receiving a second user selection indicating that the interactive stream item is no longer selected; and causing the second plurality of interactive stream items to be presented in the first presentation mode.

In accordance with some embodiments of the disclosed subject matter, systems for navigating through a stream of content items are provided, the systems comprising: a hardware processor that is programmed to: cause a media content item to be presented in a user interface; receive a stream of content including a first plurality of interactive stream items; cause the first plurality of interactive stream items to be presented in a first presentation mode, wherein the first presentation mode presents each of the first plurality of interactive stream items in a region of the user interface as each of the first plurality of interactive stream items is received and as the media content item is being presented; receive a first user selection of an interactive stream item from at least a portion of the first plurality of interactive stream items that is currently being presented in the region of the user interface; continue to receive the stream of content including a second plurality of interactive stream items; in response to receiving the first user selection and the second plurality of interactive stream items, determine a second presentation mode based at least in part on a content type associated with the second plurality of interactive stream items; cause the second plurality of interactive stream items to be presented in a second presentation mode, wherein the second presentation mode presents each of the second plurality of interactive stream items adjacent to the selected interactive stream item; receive a second user selection indicating that the interactive stream item is no longer selected; and cause the second plurality of interactive stream items to be presented in the first presentation mode.

In accordance with some embodiments of the disclosed subject matter, non-transitory computer-readable media containing computer executable instructions that, when executed by a processor, cause the processor to perform a method for navigating through a stream of content items are provided. The method comprises: causing a media content item to be presented in a user interface; receiving a stream of content including a first plurality of interactive stream items; causing the first plurality of interactive stream items to be presented in a first presentation mode, wherein the first presentation mode presents each of the first plurality of interactive stream items in a region of the user interface as each of the first plurality of interactive stream items is received and as the media content item is being presented; receiving a first user selection of an interactive stream item from at least a portion of the first plurality of interactive stream items that is currently being presented in the region of the user interface; continuing to receive the stream of content including a second plurality of interactive stream items; in response to receiving the first user selection and the second plurality of interactive stream items, determining a second presentation mode based at least in part on a content type associated with the second plurality of interactive stream items; causing the second plurality of interactive stream items to be presented in a second presentation mode, wherein the second presentation mode presents each of the second plurality of interactive stream items adjacent to the selected interactive stream item; receiving a second user selection indicating that the interactive stream item is no longer selected; and causing the second plurality of interactive stream items to be presented in the first presentation mode.

In accordance with some embodiments of the disclosed subject matter, a system for navigating through a stream of content items is provided, the system comprising: means for causing a media content item to be presented in a user interface; means for receiving a stream of content including a first plurality of interactive stream items; means for causing the first plurality of interactive stream items to be presented in a first presentation mode, wherein the first presentation mode presents each of the first plurality of interactive stream items in a region of the user interface as each of the first plurality of interactive stream items is received and as the media content item is being presented; means for receiving a first user selection of an interactive stream item from at least a portion of the first plurality of interactive stream items that is currently being presented in the region of the user interface; means for continuing to receive the stream of content including a second plurality of interactive stream items; in response to receiving the first user selection and the second plurality of interactive stream items, means for determining a second presentation mode based at least in part on a content type associated with the second plurality of interactive stream items; means for causing the second plurality of interactive stream items to be presented in a second presentation mode, wherein the second presentation mode presents each of the second plurality of interactive stream items adjacent to the selected interactive stream item; means for receiving a second user selection indicating that the interactive stream item is no longer selected; and means for causing the second plurality of interactive stream items to be presented in the first presentation mode.

In some embodiments, the stream of content includes messages associated with an online conversation.

In some embodiments, the system further comprises: means for causing a first interactive stream item of the first plurality of interactive stream items that was received at a first time to be presented at a first position in the user interface; in response to receiving a second interactive stream item of the first plurality of interactive stream items, means for causing the first interactive stream item to be presented at a second position in the user interface; and means for causing the second interactive stream item to be presented at the first position in the user interface.

In some embodiments, the first position is below the second position.

In some embodiments, the system further comprises: means for causing the selected interactive stream item to be presented at a first position in the user interface; means for causing a first interactive stream item of the second plurality of interactive stream items that was received at a first time to be presented at a second position in the user interface, wherein the second position is below the first position; in response to receiving a second interactive stream item of the second plurality of interactive stream items at a second time, means for causing the first interactive stream item to be presented at a third position in the user interface, wherein the third position is below the first position in the user interface and above the second position in the user interface; and means for causing the second interactive stream item to be presented at the second position in the user interface.

In some embodiments, the system further comprises: means for receiving a third interactive stream item at a third time; means for determining that the number of received interactive stream items exceeds a predetermined threshold; means for causing the first interactive stream item to no longer be presented; means for causing the second interactive stream item to be presented at the third position in the user interface; and means for causing the third interactive stream item to be presented at the second position on the screen.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 7A, 7B, 8A, 8B, and 9 show alternative examples of user interface for presenting a stream of content in connection with presentation of a video in accordance with some embodiments of the disclosed subject matter.

DETAILED DESCRIPTION

Figure 1A:
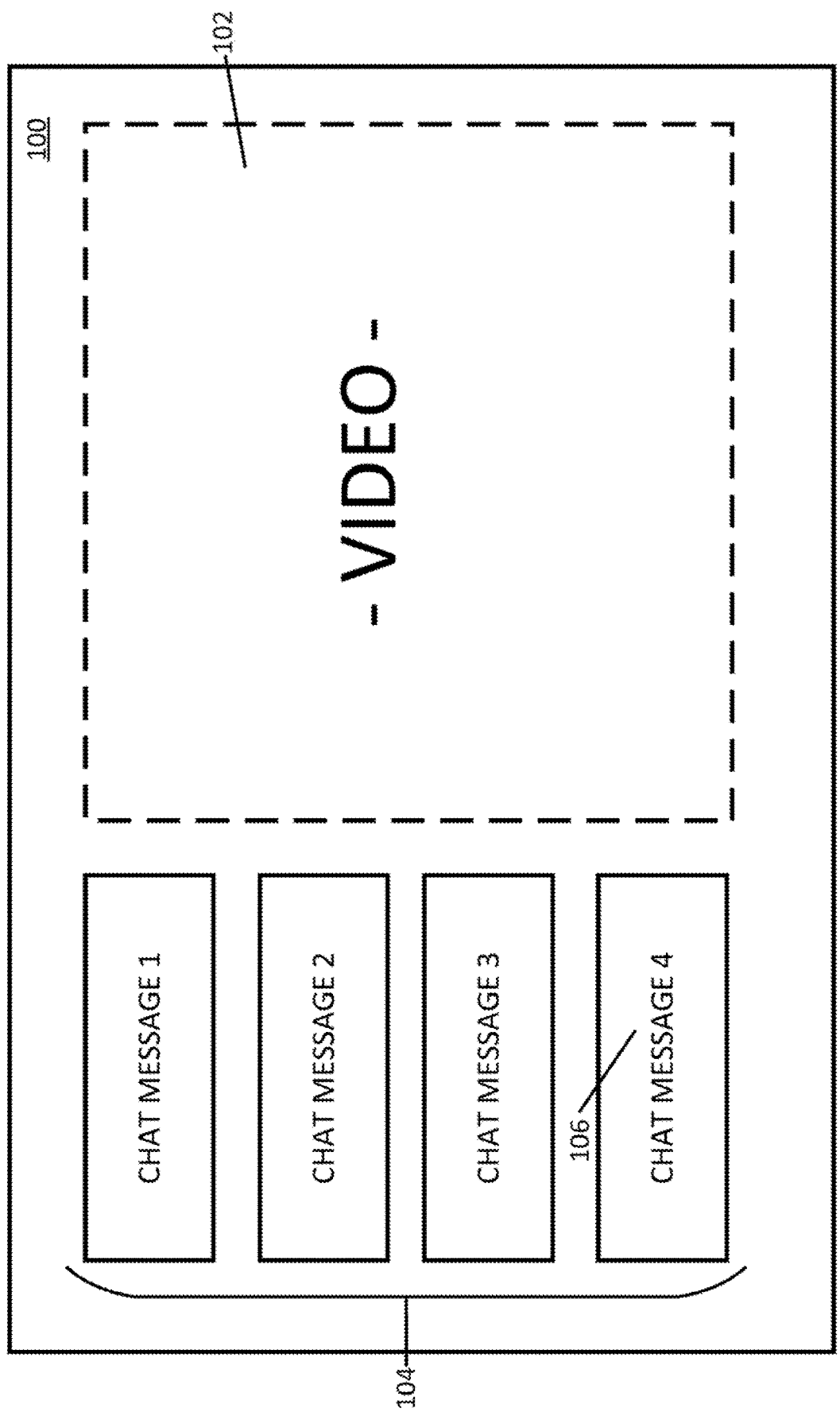
FIGS. 1A, 1B, and 3 show examples of user interfaces for presenting a stream of content in connection with presentation of a video in accordance with some embodiments of the disclosed subject matter.

In accordance with various embodiments, mechanisms (which can include methods, systems, and media) for navigating through a stream of content items are provided.

In accordance with some embodiments, the mechanisms described herein can cause a stream of content to be presented in a first presentation mode on the screen of a user device. For example, in some embodiments, the stream of content can include messages in an online conversation (e.g., chat messages, instant messages, text messages, emails, and/or any other suitable type of messages). In some embodiments, presentation of the messages can be updated in any suitable manner as new messages are received. For example, in some embodiments, the mechanisms can cause messages to scroll in a particular direction on the screen to allow newly received messages to be presented, and can cause only the most recently received messages in the conversation to be presented.

In some embodiments, the mechanisms can determine that an interactive stream item from the stream of content has been selected on the user device. For example, in some embodiments, the interactive stream item can include an interface to initiate an audio and/or video call with another user, an interface to share a video being presented, an interface to comment on a web page and/or on a page of a social networking site, and/or any other suitable interactive stream item. In some embodiments, the mechanisms can cause the messages of the online conversation to be presented in a second presentation mode on the screen. For example, in some embodiments, the mechanisms can continue presenting the interactive stream item as a user interacts with the interactive stream item, and can cause the messages to scroll in a portion of the screen that does not include the interactive stream item. In some embodiments, the mechanisms can then cause presentation of the messages to revert to the first presentation mode after determining that the interactive stream item is no longer selected and/or is no longer being interacted with.

Note that, in some embodiments, the mechanisms described herein can be used for a variety of applications. For example, in some embodiments, the mechanisms described herein can be used in any applications in which a stream of content items is presented and updated as additional content items within the stream are received. As a more particular example, in some embodiments, the stream of content items can include received messages (e.g., text messages, chat messages, e-mails, notifications of voice and/or video calls, and/or any other suitable types of messages), notifications received from any suitable application (e.g., a social networking site, an e-mail client, and/or any other suitable application), and/or any other suitable types of streamed items. Additionally, in some embodiments, the stream of items can be presented in connection with any other suitable content, such as video content (e.g., streaming video, a television program, a movie, and/or any other suitable type of video content), an audio and/or video call, and/or any other suitable content.

Turning to FIG. 1A, an example 100 of a user interface for presenting a stream of content is shown in accordance with some embodiments of the disclosed subject matter. In some embodiments, user interface 100 can include video content 102 and message interface 104. Note that, in FIGS. 1A, 1B, 2A, 2B, and 3, the stream of content includes messages that are shown in connection with a presentation of video content, but that the messages can be presented in connection with any suitable type of content and/or without accompanying content.

In some embodiments, video content 102 can include any suitable type of video content (e.g., television programs, movies, live-streamed content, and/or any other suitable type of content). In some embodiments, video content 102 can be presented within a video player window with any suitable controls (e.g., a pause control, a rewind control, a fast-forward control, a volume control, and/or any other suitable controls). Note that the position of video content 102 within user interface 100 is shown as an example, and video content 102 can be presented at any suitable location in user interface 100.

In some embodiments, message interface 104 can be any suitable interface for presenting messages in an online conversation (e.g., a chat, received text messages, received email messages, and/or any other suitable type of online conversation). In some embodiments, message interface 104 can be a region or a portion of a user interface that presents video content 102. Additionally or alternatively, in some embodiments, message interface 104 can be a region for performing any other suitable actions, such as initiating and/or answer an audio and/or video call, commenting on a post on a social networking site, endorsing media content (e.g., video content 102, and/or any other suitable media content), and/or performing any other suitable actions. In some embodiments, messages presented in message interface 104 can be received from any suitable number (e.g., one, two, three, ten, and/or any other suitable number) of user devices. Individual messages presented in message interface 104, such as message 106, can include any suitable content. For example, in some embodiments, message 106 can include any suitable text, icons, graphics, images, animations, links, and/or any other suitable content. Additionally, in some embodiments, message 106 can indicate any suitable information associated with the message, such as a name of a sender of the message, a time the message was sent, an icon associated with a sender of the message, and/or any other suitable information.

Figure 1B:
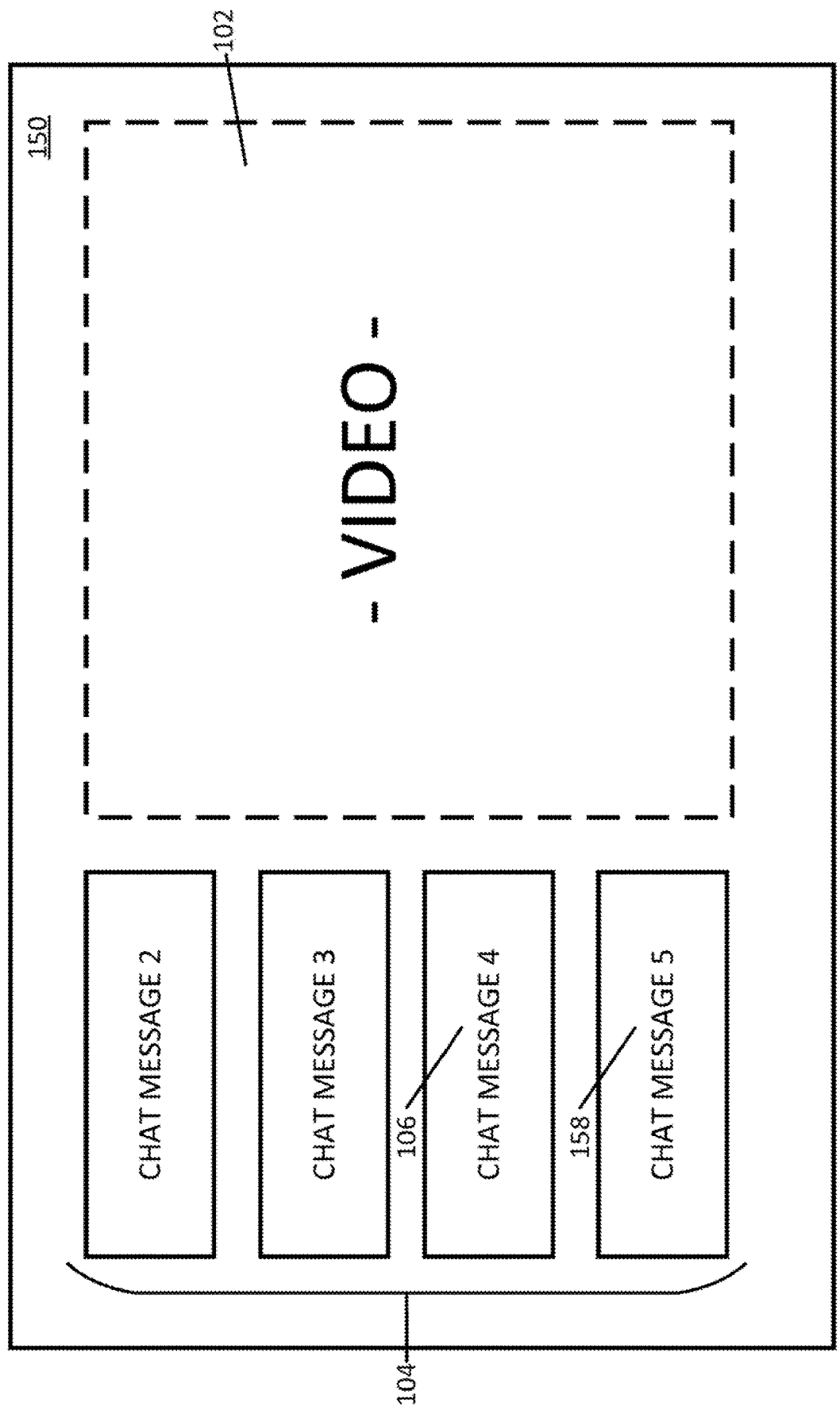

In some embodiments, messages can be updated within message interface 104, for example, as new messages are received. An example 150 of a user interface for updating messages is shown in FIG. 1B in accordance with some embodiments. In some embodiments, newly received messages can be presented at one end of message interface 104 (e.g., a bottom portion of message interface 104 as shown in FIG. 1B, a top portion of message interface 104, and/or at any other suitable position in message interface 104), and previously received messages can be moved in a particular direction (e.g., up, down, left, right, and/or in any other suitable direction) to allow the newly received message to be presented in message interface 104. For example, as shown in FIG. 1B, new message 158 can be presented at the bottom of message interface 104, and a previously received message, such as message 106 in FIG. 1A, can be presented above new message 158. In some embodiments, a fixed number (e.g., two, four, ten, and/or any other suitable number) of messages can be presented in message interface 104, and the oldest received messages can be removed from presentation in message interface 104 to allow the most recently received messages of the fixed number of messages to be presented. Alternatively, in some embodiments, a fixed amount of message content (e.g., a predetermined number of lines of text, and/or any other suitable amount of message content) can be presented in message interface 104.

Figure 2A:
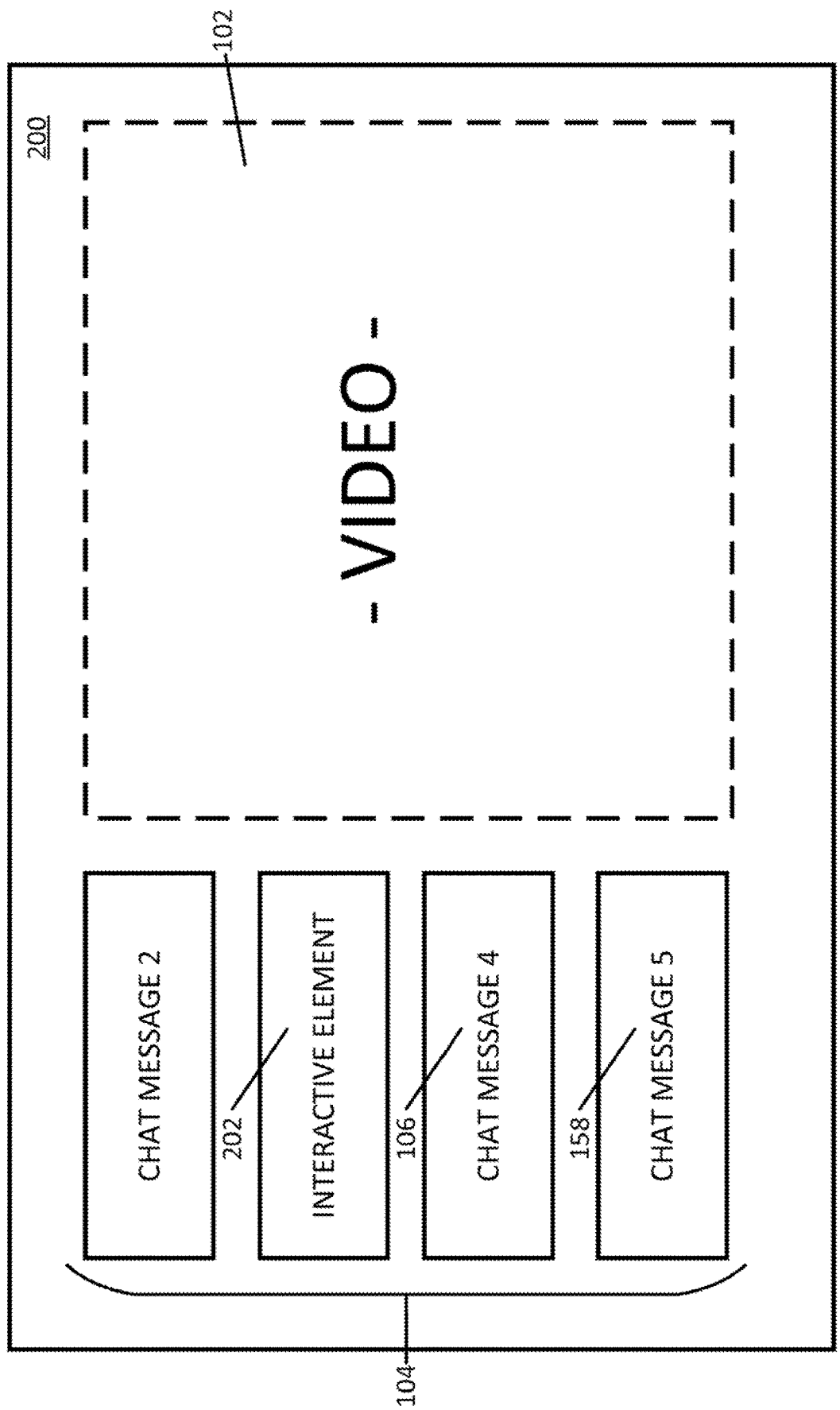
FIGS. 2A and 2B show examples of user interfaces for presenting a stream of content and an interactive stream item in accordance with some embodiments of the disclosed subject matter.

In some embodiments, interactive stream items can be presented in a user interface that includes a message interface, as shown in user interface 200 of FIG. 2A. The interactive stream items can include any suitable content that a user can interact with. For example, in some embodiments, an individual message in message interface 104 can be selectable, and selection of the message can cause an interface allowing different actions to be presented. As a more particular example, in some embodiments, the interface can allow a user to initiate an audio and/or a video call with a user device associated with the selected message, a window associated with an email client to be opened, and/or any other suitable action. As shown in FIG. 2A, in some embodiments, an interactive stream item 202 can be presented within message interface 104.

Figure 2B:
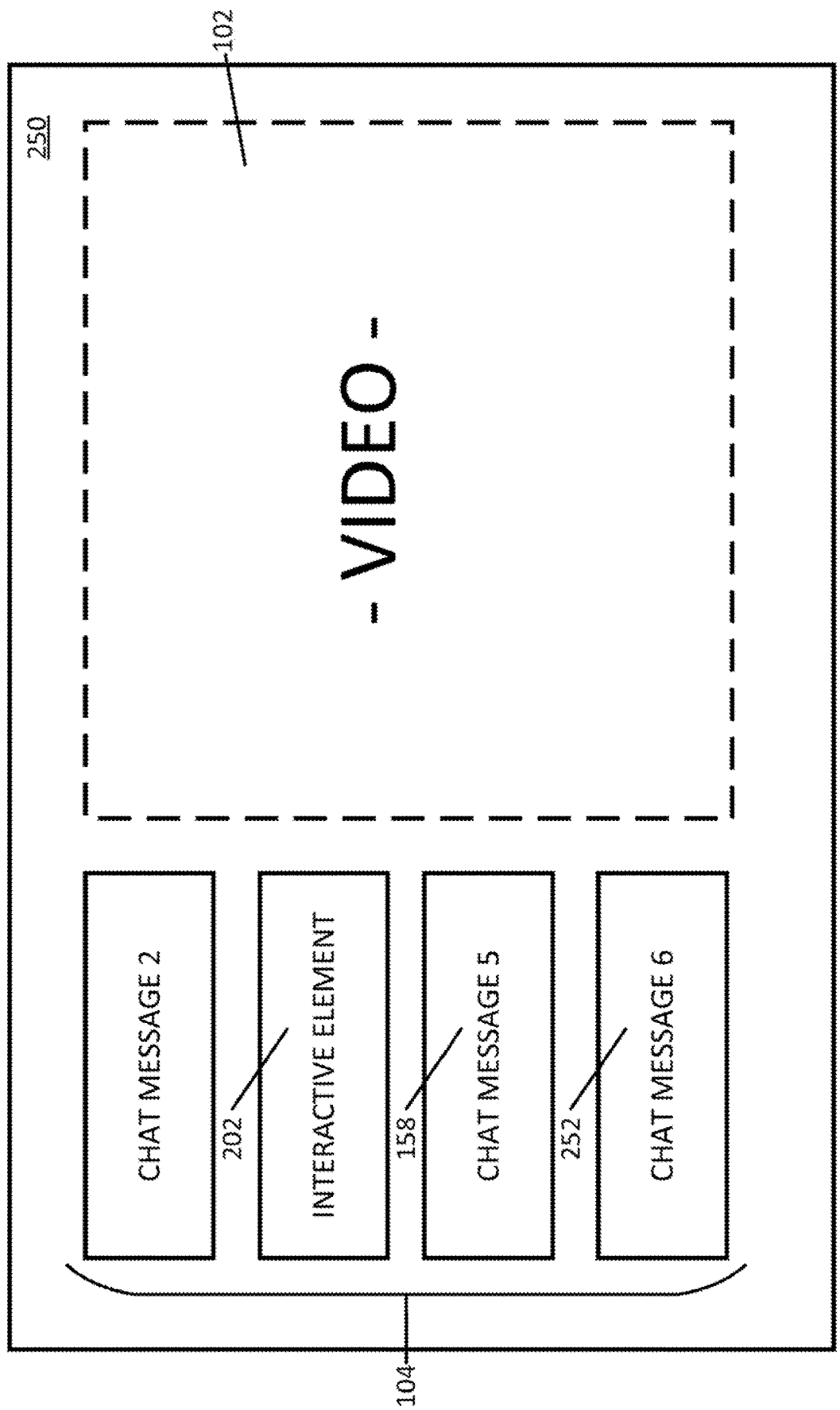

In some embodiments, newly received messages can be presented in message interface 104 while the interactive stream item is presented, as shown in user interface 250 of FIG. 2B. For example, as shown in FIG. 2B, a previously received message (e.g., message 158) can be moved upward within message interface 104 but kept below interactive stream item 202 to allow new message 252 to be presented below message 158. In some such embodiments, a position of interactive stream item 202 can be kept fixed while newly received messages are presented below interactive stream item 202. Note that, in some embodiments, a user can keep interacting with interactive stream item 202 while messages are being presented. In such embodiments, newly received messages can be continuously presented at a bottom portion of message interface 104 while the oldest previously received messages can be inhibited from presentation. In some embodiments, a fixed number (N) of messages can be presented below interactive stream item 202, and the most recently received N messages can be presented below interactive stream item 202.

Figure 3:
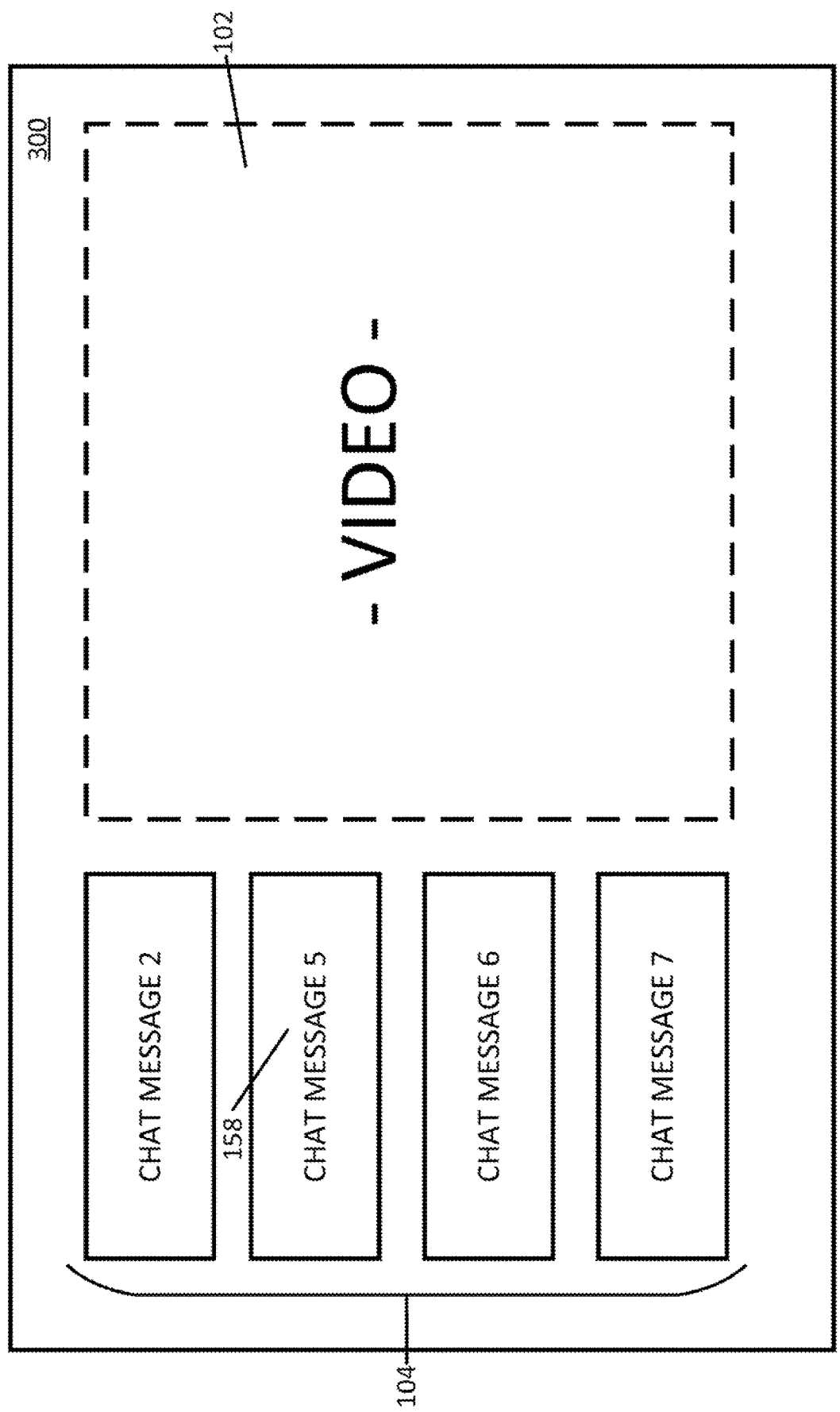

In some embodiments, presentation of messages within message interface 104 can revert to a first presentation mode as shown in user interface 300 of FIG. 3 when interaction with interactive stream item 202 stops. For example, as shown in user interface 300, presentation of interactive stream item 202 can be inhibited, and newly received messages can be presented over the entire portion of message interface 104.

Figure 7A:
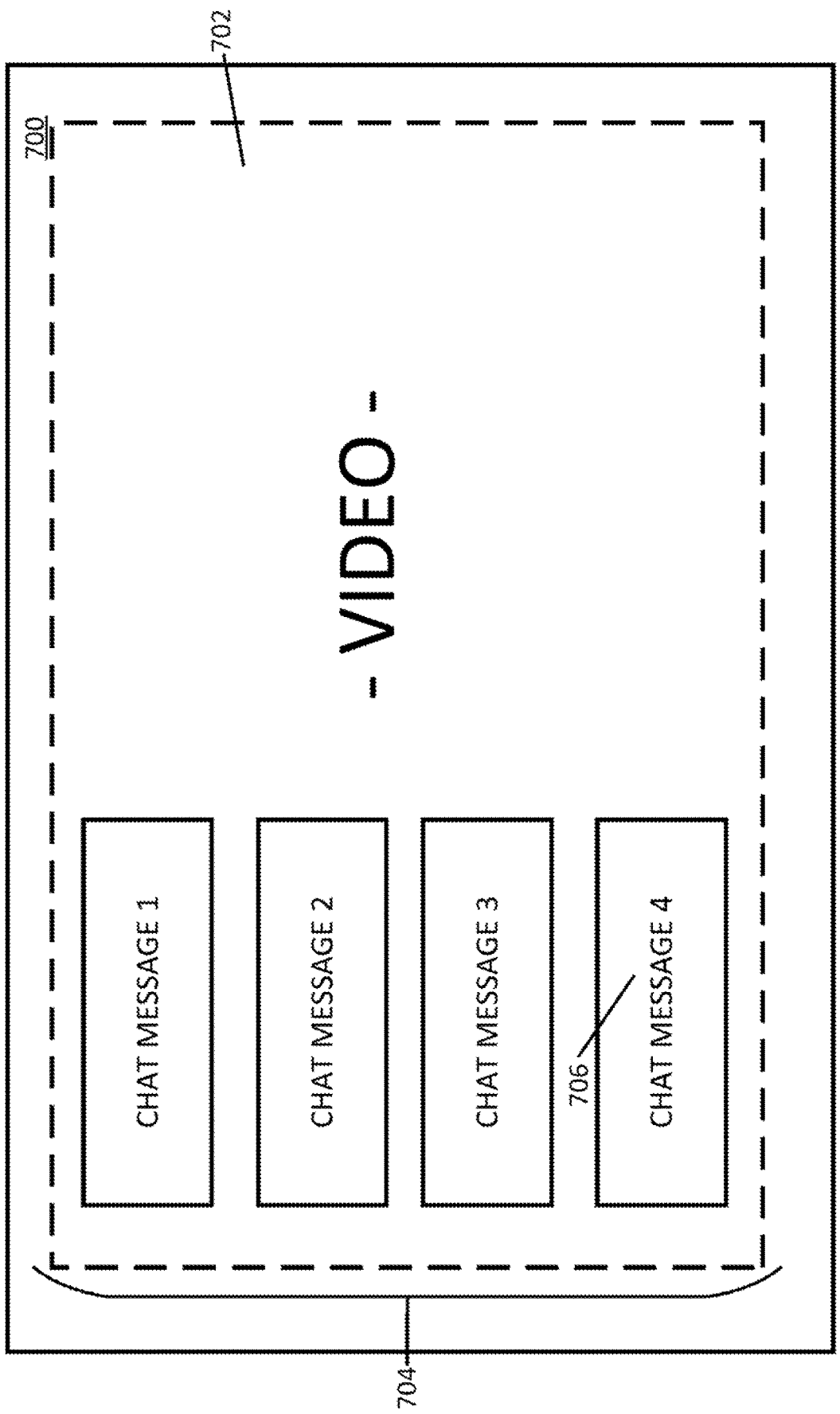
Figure 8A:
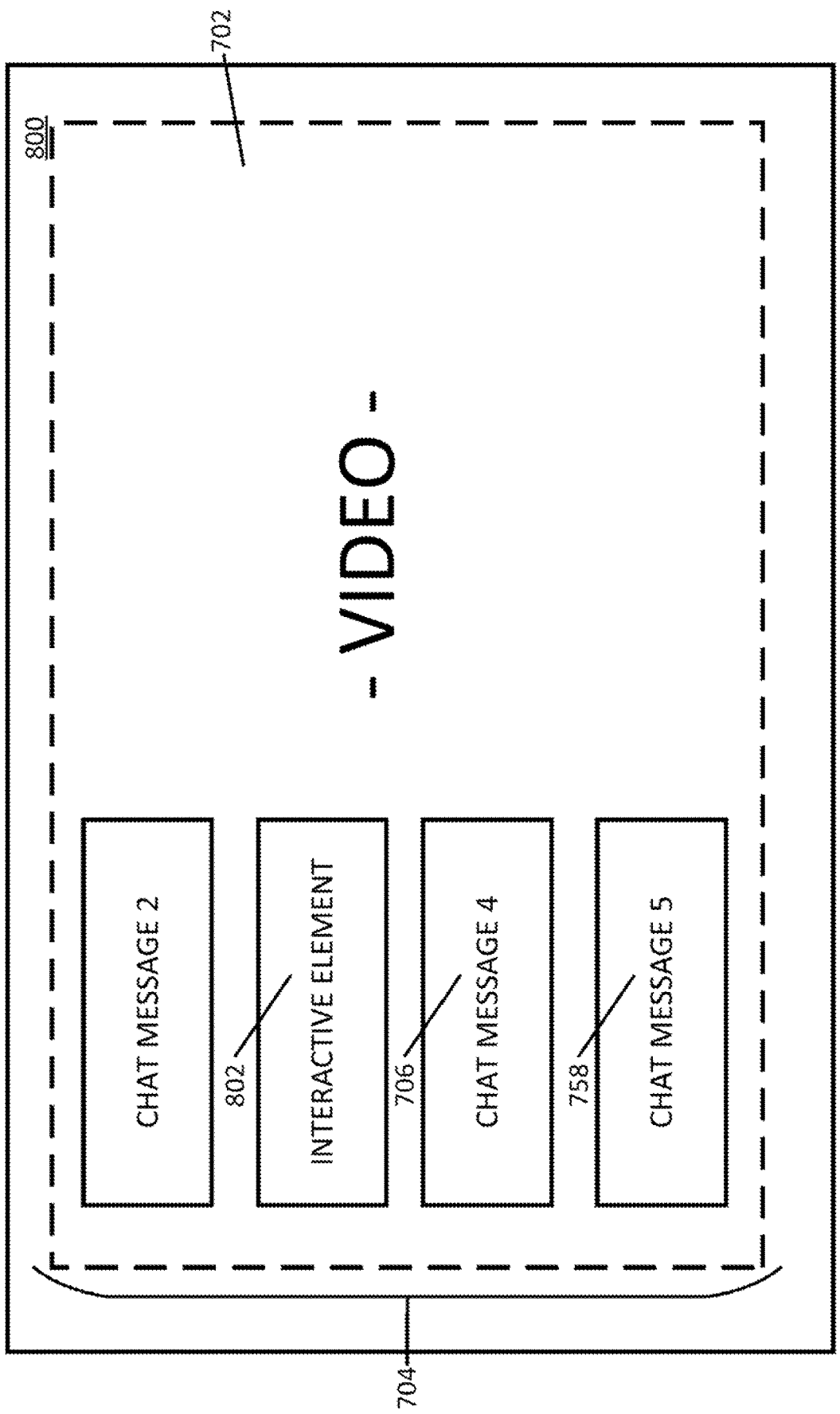
Figure 8B:
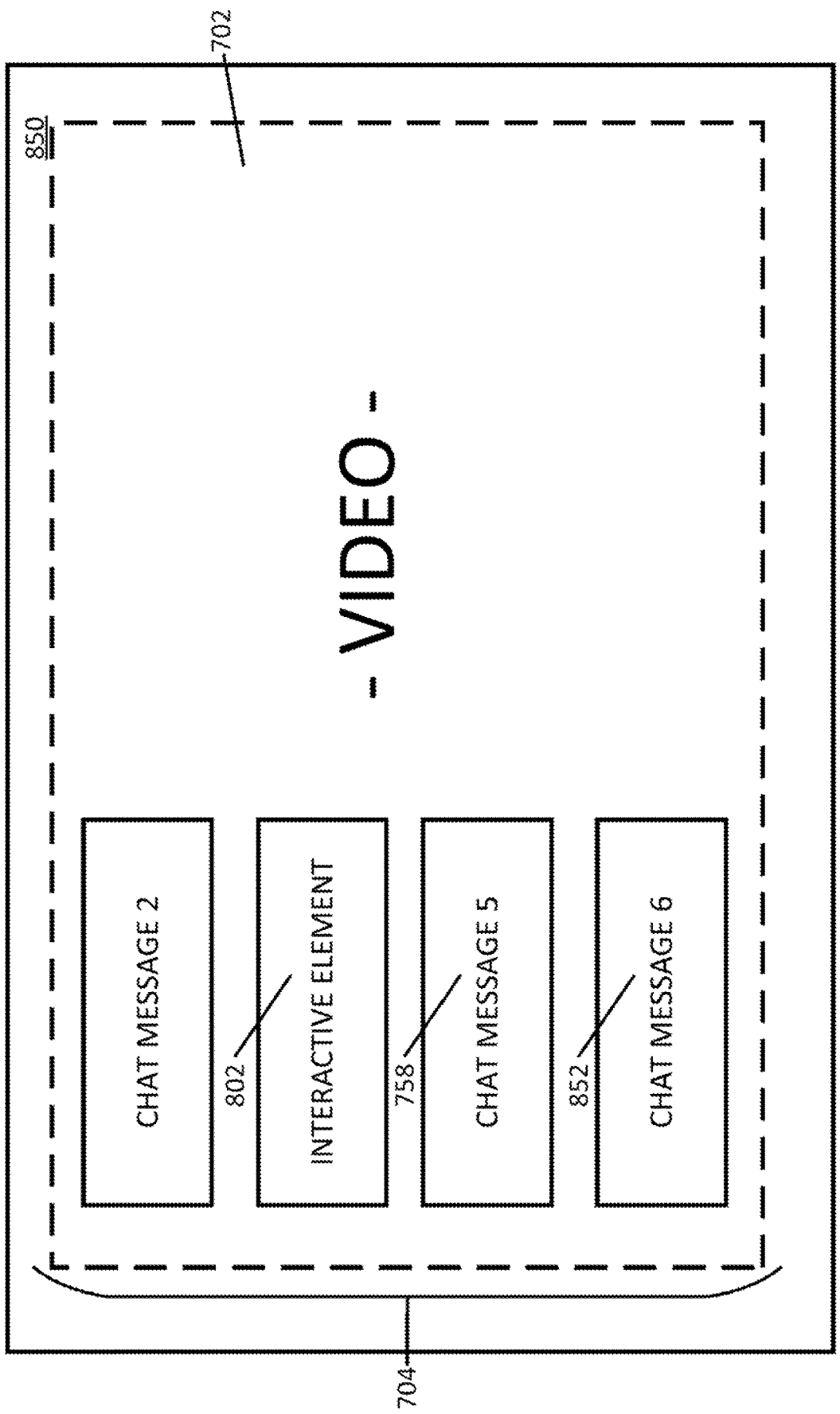

In some embodiments, the stream of content can be presented in a region or interface that is overlaid on a presentation of a video, as shown in user interfaces 700, 750, 800, 850, and 900 of FIGS. 7A, 7B, 8A, 8B, and 9. For example, video content 702 can be presented as a full-screen video within user interface 700, and a message interface 704 can be overlaid on video content 702. In some such embodiments, individual messages, such as message 706 can be presented within message interface 704, and can be overlaid on video content 702. As shown in FIGS. 7B and 9, as new messages are received, messages within message interface 704 can be updated as described above in connection with FIGS. 1B and 3, and the newly received messages can be presented within message interface 704 and overlaid on video content 702. As shown in FIGS. 8A and 8B, an interactive element 802 can be selected and interacted with within message interface 704 while presentation of video content 702 continues.

Note that FIGS. 1A, 1B, 2A, 2B, 3, 7A, 7B, 8A, 8B, and 9 are merely illustrative, and a stream of content and video content that is being concurrently presented can be arranged in any suitable manner.

Figure 4:
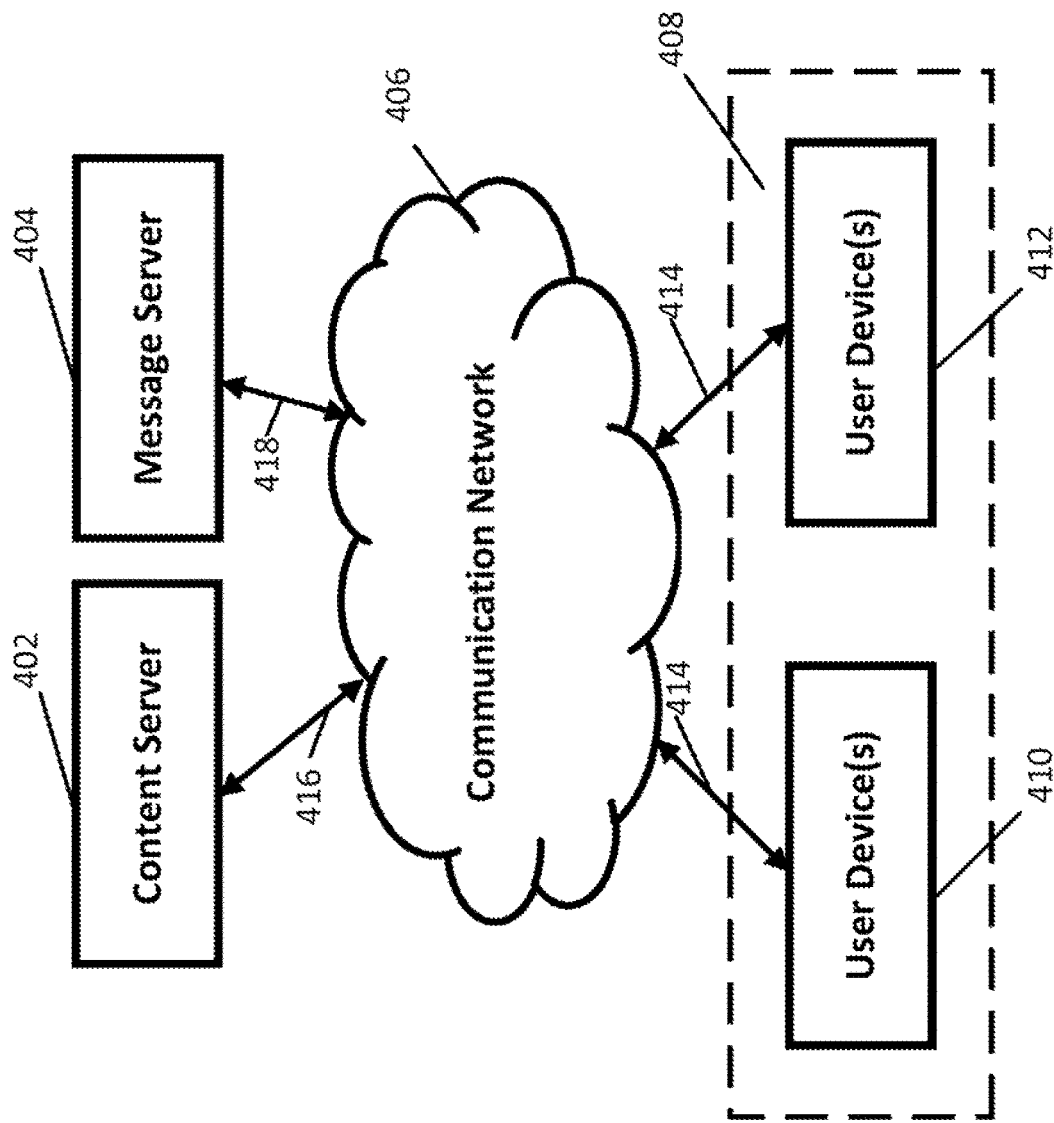
FIG. 4 shows a schematic diagram of an illustrative system suitable for implementation of mechanisms described herein for navigating through a stream of content items in accordance with some embodiments of the disclosed subject matter.

Turning to FIG. 4, an example 400 of hardware for presenting messages in connection with interactive content that can be used in accordance with some embodiments of the disclosed subject matter is shown. As illustrated, hardware 400 can include one or more servers such as a content server 402 and a message server 404, a communication network 406, and/or one or more user devices 408, such as user devices 410 and 412.

In some embodiments, content server 402 can be any suitable server for storing and/or transmitting media content to user device 408. For example, in some embodiments, content server 402 can be a server that streams media content to user device 408 via communication network 406. In some embodiments, media content stored on content server 402 can be any suitable media content, such as audio content, video content, television programs, movies, radio programs, live-streaming media content, audio books, and/or any other suitable type of media content.

In some embodiments, message server 404 can be any suitable server for storing items in a stream of content. For example, in some embodiments, message server 404 can store messages in an online conversation and/or cause messages in an online conversation to be presented on user device 408. As a more particular example, in some embodiments, message server 404 can receive messages sent from multiple user devices associated with multiple users in connection with an online conversation and can cause the received messages to be presented in any suitable format on user device 208, as described below in connection with FIG. 6.

Communication network 406 can be any suitable combination of one or more wired and/or wireless networks in some embodiments. For example, communication network 406 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 408 can be connected by one or more communications links 414 to communication network 406 that can be linked via one or more communications links (e.g., communications links 416 and 418) to server(s) 402 and/or 404. Communications links 414, 416, and/or 418 can be any communications links suitable for communicating data among user devices 408 and server(s) 402 and 404 such as network links, dial-up links, wireless links, hard-wired links, any other suitable communications links, or any suitable combination of such links.

In some embodiments, user devices 408 can include one or more computing devices suitable for viewing media content, sending and/or receiving messages, and/or any other suitable functions. For example, in some embodiments, user devices 408 can be implemented as a mobile device, such as a smartphone, mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 408 can be implemented as a non-mobile device such as a desktop computer, a set-top box, a television, a streaming media player, a game console, and/or any other suitable non-mobile device.

Although servers 402 and 404 are illustrated as two devices, the functions performed by servers 402 and 404 can be performed using any suitable number of devices in some embodiments. For example, in some embodiments, the functions performed by content server 402 and message server 404 can be performed by a single server. As another example, in some embodiments, multiple devices can be used to implement the functions performed by content server 402 and/or message server 404.

Although two user devices 410 and 412 are shown in FIG. 4, any suitable number of user devices, and/or any suitable types of user devices, can be used in some embodiments.

Figure 5:
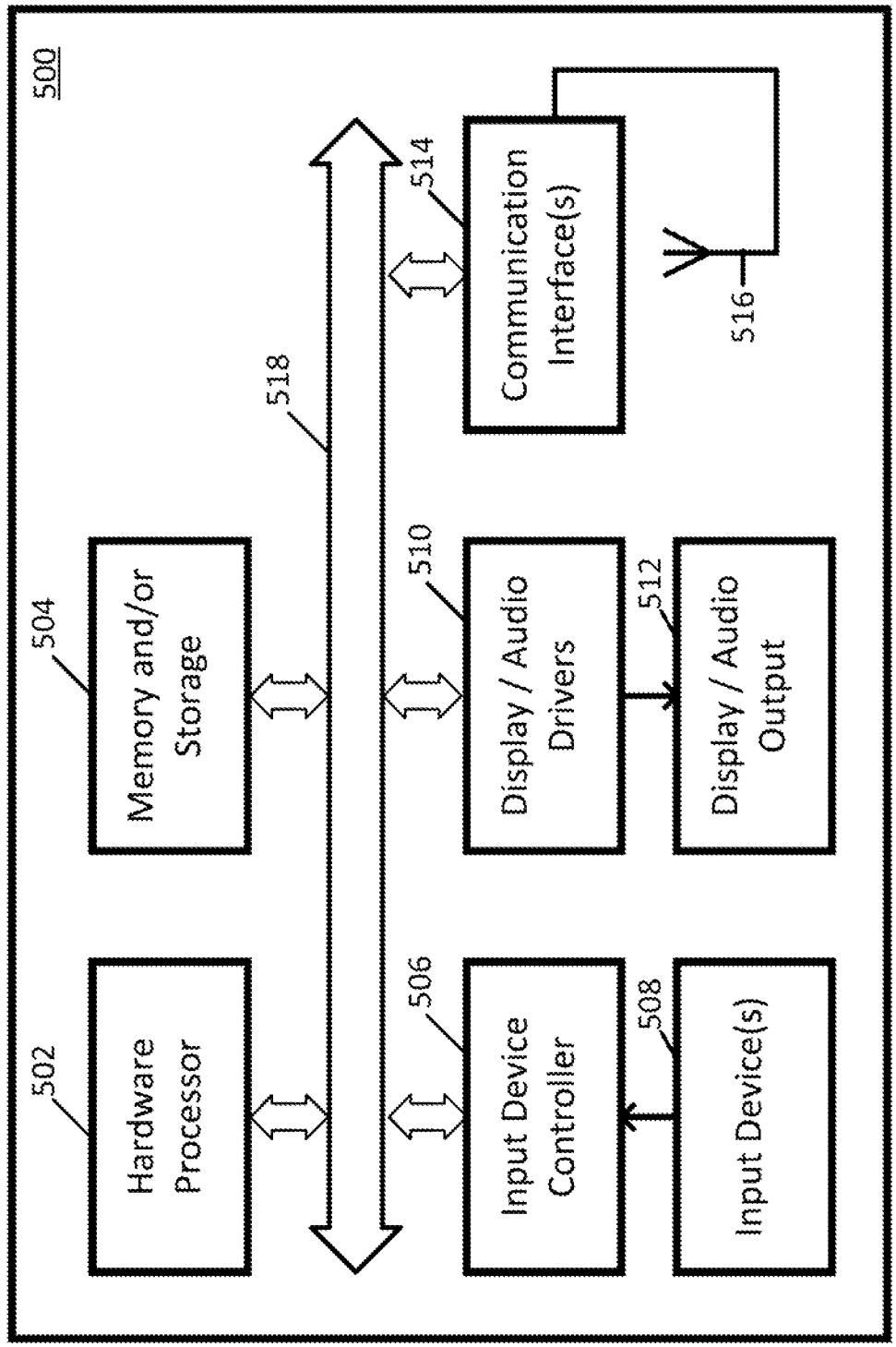
FIG. 5 shows a detailed example of hardware that can be used in a server and/or a user device of FIG. 4 in accordance with some embodiments of the disclosed subject matter.

Content server 402, message server 404, and user devices 408 can be implemented using any suitable hardware in some embodiments. For example, in some embodiments, devices 402, 404, and 408 can be implemented using any suitable general purpose computer or special purpose computer. For example, a server may be implemented using a special purpose computer. Any such general purpose computer or special purpose computer can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 514, an antenna 516, and a bus 518.

Hardware processor 502 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 502 can be controlled by a server program stored in memory and/or storage 504 of a server (e.g., such as servers 402 and/or 404). For example, the server program on content server 402 can cause hardware processor 502 to transmit video content to user device 408, and/or perform any other suitable actions. As another example, the server program on message server 404 can cause hardware processor 502 to receive messages from multiple user devices in connection with an online conversation and to transmit the received messages to a user device for presentation. In some embodiments, hardware processor 502 can be controlled by a computer program stored in memory and/or storage 504 of user device 408. For example, the computer program can cause hardware processor 502 to present video content, present messages in connection with an online conversation, change a presentation of messages in the online conversation in response to determining that a user is interactive with interactive content on the screen, and/or perform any other suitable actions.

Memory and/or storage 504 can be any suitable memory and/or storage for storing programs, data, media content, advertisements, and/or any other suitable information in some embodiments. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some embodiments. For example, input device controller 506 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 510 can be any suitable circuitry for controlling and driving output to one or more display/audio output devices 512 in some embodiments. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks, such as network 406 as shown in FIG. 4. For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 406) in some embodiments. In some embodiments, antenna 516 can be omitted.

Bus 518 can be any suitable mechanism for communicating between two or more components 502, 504, 506, 510, and 514 in some embodiments.

Any other suitable components can be included in hardware 500 in accordance with some embodiments.

Figure 6:
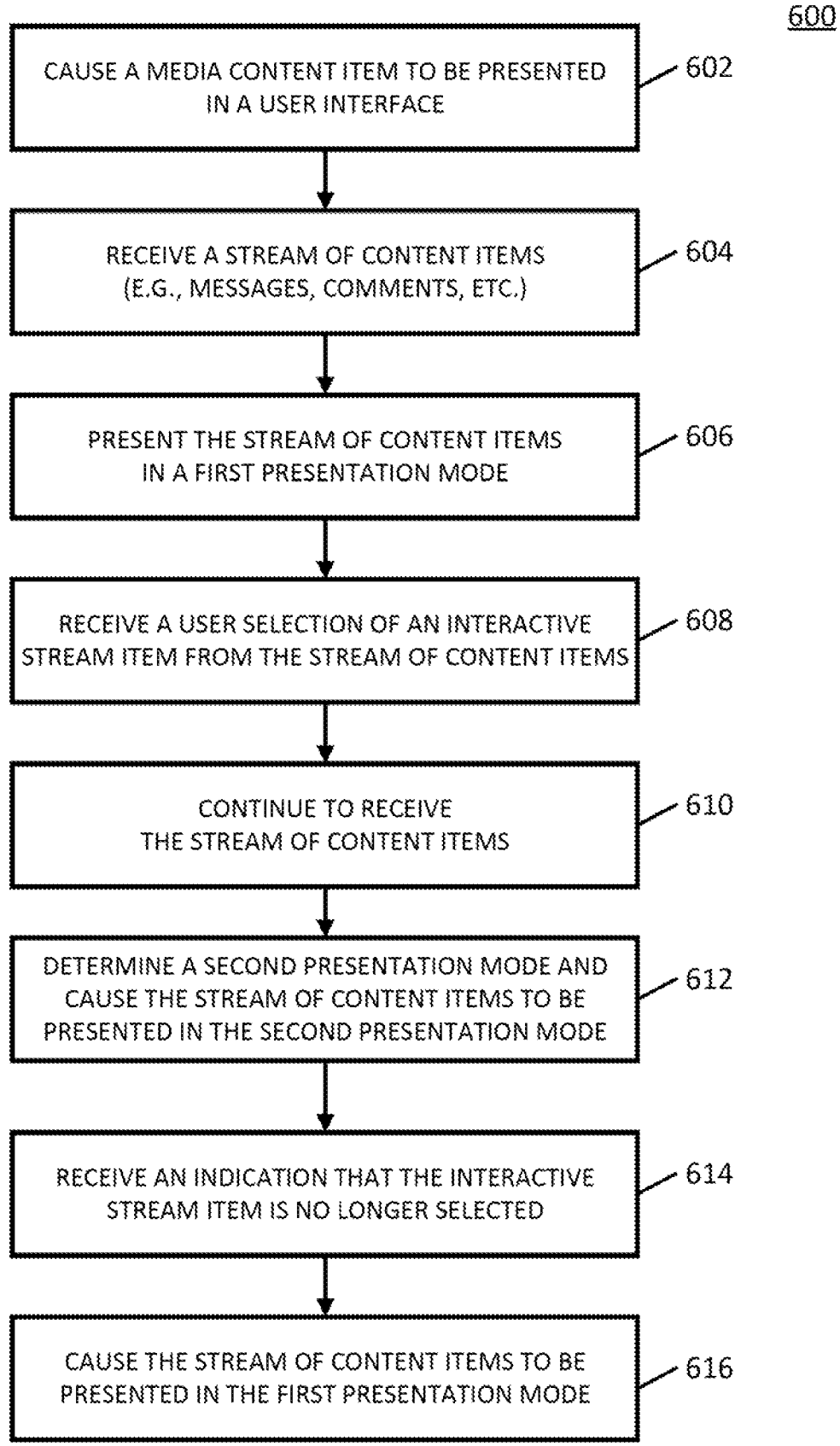
FIG. 6 shows an example of a process for navigating through a stream of content items in accordance with some embodiments of the disclosed subject matter.

Turning to FIG. 6, an example 600 of a process for navigating through content is shown in accordance with some embodiments of the disclosed subject matter. Note that, in some embodiments, blocks of process 600 can be implemented on message server 404 and/or user device 408.

Process 602 can begin by causing a media content item to be presented in a user interface. For example, as shown in FIG. 1A, video content can be presented in the user interface. In some embodiments, the media content item can be any suitable type of media content, such as a television program, a movie, a video, and/or any other suitable type of media content. Additionally or alternatively, in some embodiments, process 600 can cause any other type of content, such as a video call, to be presented in the user interface.

Process 600 can receive a stream of content items at 604. For example, in some embodiments, the stream of content items can include messages (e.g., text messages, e-mails, chat messages, and/or any other suitable types of messages), comments (e.g., related to a particular media content item, on a post on a social networking site, and/or any other suitable types of comments), and/or any other suitable stream of content items.

In some embodiments, the stream of content items can include one or more interactive stream items. For example, in some embodiments, an interactive stream item can be a content item that can be selected, and in response to being selected, a particular action can be initiated and/or performed. As a more particular example, in instances where an interactive stream item is a received message, selection of the stream item can cause an interface that allows a user associated with the received message to be called (e.g., in an audio and/or a video call). As another more particular example, in instances where the interactive stream item is a received message, selection of the stream item can cause an interface to e-mail a user associated with the received message to be presented. As yet another more particular example, in instances where an interactive stream item is a comment on a social networking site, selection of the stream item can cause an interface that allows the comment to be replied to and/or endorsed to be presented.

Process 600 can cause the stream of content items, including the interactive stream items, to be presented in a first presentation mode at 606. For example, as shown in FIG. 1A, the stream of content items can be presented in a message interface. In some embodiments, the message interface can be presented in connection with a presentation of media content, such as a video, a television program, a movie, live-streamed content, and/or any other suitable type of media content.

In some embodiments, process 600 can update the presentation of the stream of content items in any suitable manner. For example, in some embodiments, the message interface can be updated with new messages as they are received, as shown in and discussed above in connection with FIGS. 1A and 1B. For example, in some embodiments, a fixed number (N) of messages can be presented in the message interface, with older messages being removed from the message interface as newly received messages are presented, as shown in and described above in connection with FIGS. 1A and 1B. Note that, in some embodiments, a fixed amount of message content can be presented in the message interface, rather than a fixed number of messages.

Process 600 can receive an indication that an interactive stream item has been selected on the user device at 608. As described above, in some embodiments, the interactive stream item can represent any suitable type of interactive content. For example, in some embodiments, selection of a presented message in message interface 104 can cause an interface for allowing a user to initiate an audio and/or video call with the user device associated with the selected message, open an email client to transmit an email to an account associated with the selected message, and/or perform any other suitable actions to be presented. In some embodiments, the interactive stream item can be selected in any suitable manner. For example, in some embodiments, process 600 can determine that the interactive stream item has been selected in response to determining that a particular message and/or portion of a particular message presented in message interface 104 has been selected.

Process 600 can continue to receive the stream of content items at 610. For example, in instances where the stream of content items includes messages received in an online conversation, process 600 can continue receiving messages, from one or more user devices associated with participants in the online conversation. As another example, in instances where the stream of content items includes comments on a post on a social networking site, process 600 can receive additional comments associated with the post.

In response to receiving the indication that the interactive stream item has been selected, process 600 can determine a second presentation mode and can cause the stream of content items to be presented in the second presentation mode at 612. Process 600 can determine the second presentation mode using any suitable technique or combination of techniques. For example, in instances where the interactive stream item includes and/or is presented as a result of selection of one of the messages in the message interface, process 600 can identify a format that updates presentation of the messages in the online conversation around the selected message. As another example, in instances where the interactive stream item includes selection of portions of video content presented on the screen, process 600 can identify a format that presents the content stream in a portion of the screen that does not include the interactive stream item and/or the selected portion of the video content. As yet another example, in some embodiments, the second presentation mode can be determined based on a content type associated with the selected interactive stream item. As a more particular example, in some embodiments, different formats can be selected when the interactive stream item includes text messages, chat messages, e-mails, comments on a social networking post, and/or any other suitable type of content item.

Process 600 can then cause the content stream items to be presented on the screen in the second presentation mode. For example, in some embodiments, the messages can be presented such that a position of the interactive stream item remains fixed on the screen and is available for further interaction by the user, and newly received messages are updated adjacent to the position of the selected interactive stream item, as shown in and described above in connection with FIGS. 2A and 2B. As a more particular example, in some embodiments, a fixed number of messages (N') can be presented below the interactive stream item within the message interface, with older messages removed as newly received messages are presented. Note that, in some embodiments, newly received messages can be presented at any suitable location (e.g., most recently received messages can be presented at a top portion of the message interface, at a bottom portion of the message interface, at a left portion of the message interface, at a right portion of the message interface, and/or at any other suitable position).

Process 600 can receive a second indication that the interactive stream item is no longer selected and/or being interacted with on the user device at 614. For example, in some embodiments, the second indication can include information indicating that a user has closed an interface associated with the interactive stream item (e.g., closed a window to initiate an audio and/or video call, closed a window to send an email, closed a window to share a media content item, and/or closed any other suitable interface).

At 616, process 600 can cause the messages in the online conversation to be presented in the first presentation mode in response to determining that the interactive stream item is no longer selected and/or being interacted with. For example, in instances where the first presentation mode includes updating received messages in the conversation through an entire portion of a message interface (e.g., rather than a subset of the message interface that does not include the interactive stream item), process 600 can resume using the entire portion of the message interface.

In some embodiments, at least some of the above described blocks of the process of FIG. 6 can be executed or performed in any order or sequence not limited to the order and sequence shown in and described in connection with the figure. Also, some of the above blocks of FIG. 6 can be executed or performed substantially simultaneously where appropriate or in parallel to reduce latency and processing times. Additionally or alternatively, some of the above described blocks of the process of FIG. 6 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for navigating through a stream of content items are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for navigating through content, the method comprising:
   causing, using a hardware processor, a user interface to be presented on a user device, wherein the user interface includes a video content item that is concurrently displayed with a chat interface that presents one or more chat message items;
   receiving, using the hardware processor, a stream of content including a first plurality of chat message items, wherein the first plurality of chat message items are received from a first plurality of user devices and wherein at least one chat message item in the first plurality of chat message items comprises an interactive chat message item;

causing, using the hardware processor, at least a portion of the first plurality of chat message items to be presented in the chat interface that is concurrently presented with the video content item;

receiving, using the hardware processor, a first selection of the interactive chat message item from the portion of the first plurality of chat message items being presented in the chat interface while continuing to receive the stream of content, wherein a second plurality of chat message items is included in the stream of content; and in response to receiving the first selection while continuing to receive the second plurality of chat message items, causing, using the hardware processor, the second plurality of chat message items to be presented, wherein the selected interactive chat message item is held in a fixed position within the chat interface while continuing to update the chat interface with additionally received chat message items as the additionally received chat message items are received from a second plurality of user devices other than the user device.

2. The method of claim 1, wherein the first plurality of chat message items are presented in a first presentation mode in which the at least a portion of the first plurality of chat message items is concurrently presented with the video content item.

3. The method of claim 2, wherein the second plurality of chat message items are presented in a second presentation mode in which the selected interactive chat message item is held in the fixed position within the chat interface and the chat interface is updated with the additionally received chat message items as the additionally received chat message items are received from the second plurality of user devices other than the user device.

4. The method of claim 3, wherein fewer chat message items are presented within the chat interface while in the second presentation mode than are presented while in the first presentation mode.

5. The method of claim 3, further comprising:

receiving an indication that the first presentation mode is to be used; and in response to receiving the indication that the first presentation mode is to be used, returning to the first presentation mode in which the selected interactive chat message is no longer held in the fixed position.

6. The method of claim 1, wherein each chat message item presented in the chat interface can be interacted with using the user device.

7. The method of claim 6, wherein selection of a chat message item causes a communication interface for transmitting communications to a sender of the chat message item to be opened on the user device.

8. The method of claim 7, wherein the communication interface is an interface to initiate a video call with the sender of the chat message item.

9. The method of claim 6, wherein selection of a chat message item causes a second user interface that includes a plurality of options related to the chat message item to be presented.

10. The method of claim 1, wherein the portion of the chat interface is above the fixed position within the chat interface.

11. A system for navigating through content, the system comprising:

a hardware processor that:

causes a user interface to be presented on a user device, wherein the user interface includes a video content item that is concurrently displayed with a chat interface that presents one or more chat message items;

receives a stream of content including a first plurality of chat message items, wherein the first plurality of chat message items are received from a first plurality of user devices and wherein at least one chat message item in the first plurality of chat message items comprises an interactive chat message item;

causes at least a portion of the first plurality of chat message items to be presented in the chat interface that is concurrently presented with the video content item;

receives a first selection of the interactive chat message item from the portion of the first plurality of chat message items being presented in the chat interface while continuing to receive the stream of content, wherein a second plurality of chat message items is included in the stream of content; and in response to receiving the first selection while continuing to receive the second plurality of chat message items, causes the second plurality of chat message items to be presented, wherein the selected interactive chat message item is held in a fixed position within the chat interface while continuing to update the chat interface with additionally received chat message items as the additionally received chat message items are received from a second plurality of user devices other than the user device.

12. The system of claim 11, wherein the first plurality of chat message items are presented in a first presentation mode in which the at least a portion of the first plurality of chat message items is concurrently presented with the video content item.

13. The system of claim 12, wherein the second plurality of chat message items are presented in a second presentation mode in which the selected interactive chat message item is held in the fixed position within the chat interface and the chat interface is updated with the additionally received chat message items as the additionally received chat message items are received from the second plurality of user devices other than the user device.

14. The system of claim 13, wherein fewer chat message items are presented within the chat interface while in the second presentation mode than are presented while in the first presentation mode.

15. The system of claim 13, wherein the hardware processor also:

receives an indication that the first presentation mode is to be used; and in response to receiving the indication that the first presentation mode is to be used, returns to the first presentation mode in which the selected interactive chat message is no longer held in the fixed position.

16. The system of claim 11, wherein each chat message item presented in the chat interface can be interacted with using the user device.

17. The system of claim 16, wherein selection of a chat message item causes a communication interface for transmitting communications to a sender of the chat message item to be opened on the user device.

18. The system of claim 17, wherein the communication interface is an interface to initiate a video call with the sender of the chat message item.

19. The system of claim 16, wherein selection of a chat message item causes a second user interface that includes a plurality of options related to the chat message item to be presented.

20. The system of claim 11, wherein the portion of the chat interface is above the fixed position within the chat interface.

21. A non-transitory computer-readable medium containing computer executable instructions that, when executed, cause a hardware processor to perform a method for navigating through content, the method comprising:

causing a user interface to be presented on a user device, wherein the user interface includes a video content item that is concurrently displayed with a chat interface that presents one or more chat message items;

receiving a stream of content including a first plurality of chat message items, wherein the first plurality of chat message items are received from a first plurality of user devices and wherein at least one chat message item in the first plurality of chat message items comprises an interactive chat message item;

causing at least a portion of the first plurality of chat message items to be presented in the chat interface that is concurrently presented with the video content item;

receiving a first selection of the interactive chat message item from the portion of the first plurality of chat message items being presented in the chat interface while continuing to receive the stream of content, wherein a second plurality of chat message items is included in the stream of content; and in response to receiving the first selection while continuing to receive the second plurality of chat message items, causing the second plurality of chat message items to be presented, wherein the selected interactive chat message item is held in a fixed position within the chat interface while continuing to update the chat interface with additionally received chat message items as the additionally received chat message items are received from a second plurality of user devices other than the user device.

* * * * *